United States Patent [19]

Orensteen et al.

[11] Patent Number: 4,708,920
[45] Date of Patent: Nov. 24, 1987

[54] MICROLENS SHEET CONTAINING DIRECTIONAL HALF-TONE IMAGES AND METHOD FOR MAKING THE SAME

[75] Inventors: Bruce D. Orensteen, St. Paul; Thomas I. Bradshaw, Afton, both of Minn.

[73] Assignee: Minnesota Mining and Manufacturing Company, St. Paul, Minn.

[21] Appl. No.: 19,026

[22] Filed: Feb. 26, 1987

Related U.S. Application Data

[63] Continuation-in-part of Ser. No. 776,594, Sep. 16, 1985, abandoned.

[51] Int. Cl.⁴ .................. G03C 1/96; F16L 55/00; F16L 35/00; F16J 15/00
[52] U.S. Cl. .................................... 430/11; 430/10; 430/273; 430/290; 430/496; 430/945; 430/946; 430/346; 283/85; 283/87; 283/91; 283/93
[58] Field of Search .................. 430/10, 11, 346, 273, 430/290, 496, 946; 283/85, 87, 91, 93

[56] References Cited

U.S. PATENT DOCUMENTS

| | | | |
|---|---|---|---|
| 3,154,872 | 11/1964 | Nordgten | 40/135 |
| 3,190,178 | 6/1965 | McKenzie | 88/82 |
| 3,503,315 | 3/1970 | Montebello | 95/18 |
| 3,801,183 | 4/1974 | Sevelin et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |
| 4,314,022 | 2/1982 | Fisch | 430/326 |

FOREIGN PATENT DOCUMENTS 0148004  8/1984  Japan.

Primary Examiner—Richard L. Schilling
Attorney, Agent, or Firm—Donald M. Sell; James A. Smith; Robert H. Jordan

[57] ABSTRACT

A sheet containing an integrated-directional, half-tone image. Each sheet may contain one or more such images. Also a method for forming such images in microlens sheetings comprising directly a highly collimated light through an interposed half-tone mask.

19 Claims, 2 Drawing Figures

MICROLENS SHEET CONTAINING DIRECTIONAL HALF-TONE IMAGES AND METHOD FOR MAKING THE SAME

CROSS-REFERENCE TO RELATED APPLICATION

This application is a continuation-in-part of pending patent application Ser. No. 776,594, filed Sept. 16, 1985 now abandoned.

FIELD OF INVENTION

The present invention concerns microlens sheets containing one or more directional images. A directional image is viewable only at or within a range centered on a predetermined angle, a region described herein as a conical field of view. The present invention also concerns a method for forming such sheets.

BACKGROUND ART

Sheeting into which a visible pattern or legend is built has found a number of important uses, particularly as distinctive labels useful to authenticate an article or document. Such sheetings, as taught in U.S. Pat. No. 3,154,872 (Nordgren); U.S. Pat. No. 3,801,183 (Sevelin et al.); U.S. Pat. No. 4,082,426 (Brown); and U.S. Pat. No. 4,099,838 (Cook et al.), have found use as validation stickers for vehicle license plates and as security films for driver's licenses, government documents, phonograph records, tape cassettes, and the like. These references teach that the legends must be incorporated into the sheeting when the sheeting is being made.

U.S. Pat. No. 4,200,875 (Galanos) discloses a method of forming directional images in retroreflective sheeting which comprises a monolayer of glass microspheres and a reflective masking layer. In that method, laser irradiation of the retroreflective sheeting in an imagewise fashion causes structural alterations or modifications in the sheet which are viewable as directional images.

Hockert et al., Jap. Appln. No. 19824/84, filed Feb. 6, 1984, Kokai No. 148004/84, laid open Aug. 24, 1984, forms a directional image in sheeting which comprises a monolayer of microlenses, a masking layer which may be a reflective material or a thin laser penetrable material disposed behind the monolayer of microlenses, and a transparent spacing layer located between those two layers. The sheeting taught therein may also employ one or more transparent layers on the opposite side of the monolayer of microlenses from the spacer layer. Sheeting with such additional layer(s) is known as "enclosed-lens" or "embedded-lens" retroreflective sheeting.

The latter reference teaches the irradiation of such sheeting with a laser beam to form openings, or axial markings, in the masking layer which are visible as a directional image. The transparent spacer layer may be colored at the axial markings to provide a colored directional image. Further, when the axial markings have been colored, the masking layer may be removed, thereby making the sheet transparent. The sheet may then be adhered to a document as an overlay which provides a secure method of authenticating the document.

SUMMARY OF INVENTION

This invention advances the art of security film-type products by providing a novel sheet that bears one or more integrated-directional, half-tone images. These half-tone, or photographic, images have gradations of light and dark areas, and can also have great detail and resolution, making them suitable for many purposes. For instance, sheets bearing such images can be provided as a means of authentication. Also, the half-tone images provided by this invention are integrated-directional, i.e., the various portions of the image are only seen substantially all together as a complete image, throughout a conical field of view.

In brief summary, the novel sheet comprises:

(a) a monolayer of closely spaced transparent microlenses, which are preferably glass microspheres, (b) a means for supporting the microlenses in the monolayer, and (c) a set of axial markings of substantially equal size, each marking being located at the rear of a microlens at a position such that the set of axial markings is visible as an integrated-directional, half-tone image having gradations of light and dark areas.

"Axial markings" are defined herein as visibly distinctive structures of limited area, such as coated spots, openings in otherwise continuous layers, deformities within a layer, or deformities within individual microlenses, whose center points are respectively located on axes that extend through the optical center of individual microlenses and intersect at a common viewing point or line, or are parallel to one another.

Briefly, a method of making the novel sheet of the invention comprises directing highly collimated light, such as is emitted by a laser, through a half-tone mask at a selected angle of incidence toward the front of a sheeting which comprises a monolayer of closely spaced transparent microlenses, sometimes referred to herein as microlens sheeting, to form a corresponding pattern of axial markings in the sheeting. When the resulting sheet is viewed at the angle of incidence of the collimated light, the set of axial markings is visible as a half-tone or photographic image under ordinary diffuse lighting conditions and under retroreflective conditions if the microlens sheeting is retroreflective.

DETAILED DESCRIPTION OF INVENTION

The preferred source of highly collimated light is normally a Q-switched, pulsed laser beam. Q-switched, pulsed laser beams are typically the most efficient type of collimated light for forming axial markings in microlens sheeting.

If a negative half-tone mask is used, the set of axial markings will be visible as a positive image. Conversely, a positive half-tone mask may be used to produce a set of axial marking that is visible as a negative image.

When forming an image according to this invention, the mask is preferably placed in direct contact with the face of the sheeting during irradiation to maximize the resolution of the image which is formed and to minimize diffraction effects caused by a separated mask and microlens sheeting. Such diffraction effects may tend to reduce the resolution achieved in the sheeting and to interfere with the desired integrated-directional effect.

Half-tone dots will typically be either round or square. Typically, the maximum-size discrete, i.e., non-contiguous, half-tone dots occur in a region of the mask having a light transmittance of about 50 percent, which correlates to an optical density of about 0.3. The smallest half-tone dots typically occur in a region of the mask having a transmittance of about 90 to 95 percent.

The size, i.e., cross-sectional area, of the maximum-size discrete dots of the half-tone mask is preferably at least three, and more preferably at least four or five, times as great as the average size of the microlenses so that the smaller half-tone dots in the regions of the mask permitting higher transmittance will still be substantially as large as or larger than the average size of the microlenses. For example, a typical half-tone mask that was observed to have dots about 200 micrometers square at the 50 percent transmittance level, and dots that were about 50 micrometers square at the 95 percent transmittance level, was used as taught herein to make an integrated-directional, half-tone image in a microlens sheeting comprising spherical microlenses having an average diameter of about 50 micrometers. If the maximum-size discrete dots of the mask are of substantially smaller size than the preferred size in relation to the microlenses, the resultant directional image may tend to not be integrated. However, the resolution and detail of an image may tend to decline as the size of the maximum-size discrete half-tone dots in the mask is increased.

Preferably the half-tone mask with which the sheeting is imaged is specularly reflective. Nonreflective masks may deteriorate with use because much of the energy blocked from reaching the target sheet is absorbed. The absorbed energy tends to heat the image constituent means of the mask and may cause a breakdown of those constituent means; for example, heat may cause deterioration of an image formed from silver halide particles in a conventional photographic negative. Substantial breakdown and deterioration of a mask may render it unsuitable to provide the photographic quality images which are an object of this invention. Reflective masks may typically be used repeatedly without suffering damage due to heat buildup. The reflectance of a mask need not be 100 percent in order for this mechanism to be advantageously employed. An example of a suitable specularly reflective mask is disclosed in U.S. Pat. No. 4,314,022 (Fisch).

An axial marking is formed at the rear of each microlens which the collimated light transmitted through the half-tone mask strikes. The precise location within the microlens sheeting at which the axial markings are formed is determined by the construction of the microlens sheeting and the method used for forming directional images. For instance, each axial marking may be a deformity formed in a microlens itself, or an opening formed in a layer which is moderately spaced therefrom. As used herein, "at the rear of" is meant to refer to all such locations.

Among the types of microlens sheeting which may be useful in this invention are "exposed-lens" sheeting, wherein the microlenses protrude from the front of the sheeting; "encapsulated-lens" sheeting, disclosed in McKenzie, U.S. Pat. No. 3,190,178, which is similar to exposed-lens sheeting in that the microlenses protrude from a binder layer, but further comprises a transparent film covering the microlenses; and "embedded-lens" sheeting, wherein the microlenses are embedded in a transparent protective layer. Retroreflective embedded-lens and encapsulated-lens sheetings remain retroreflective even when wet, whereas exposed-lens sheeting does not, making encapsulated-lens and embedded-lens sheetings preferred for many outdoor applications, such as for traffic signs.

The microlenses of the microlens sheeting imaged according to the novel method are preferably spherical because they may be imaged from a wide range of angles of incidence, and if the sheeting is retroreflective, it will be retroreflective over a wide range of angles. Other kinds of microlenses may also be used, such as, for example, the microlenses disclosed in de Montebello, U.S. Pat. No. 3,503,315. Glass microlenses are preferred because they tend to be more durable than microlenses formed from other materials.

Microspheres with a refractive index within a range of 1.5 to 2.7 are useful. However, microspheres with refractive indices above 2.4 may introduce coloring, whereas colorless clarity is usually preferred, especially when the sheeting is adhered as a transparent overlay to a document. Microspheres with a refractive index of approximately 1.8 to 2.0 are preferred for sheeting in which the microspheres are partially embedded in and partially protrude from the sheeting, because under those conditions the microspheres focus visible light at approximately the back surface of the microspheres.

The glass microspheres preferably have an average diameter of 10 to 100 micrometers, and are ideally of a substantially uniform diameter of approximately 50 to 60 micrometers. If the microspheres are much larger, the sheeting tends to become thicker and more expensive to make, and images formed therein will have less resolution. If the microspheres are much smaller, images formed in the sheeting will have greater resolution, but it is more difficult to uniformly distribute the microlenses when constructing the sheeting. As the microspheres become smaller than approximately 10 to 20 micrometers, diffraction losses may cause the sheeting to be less brightly reflective, thus reducing the contrast between the image and surrounding background thereby rendering the image more difficult to locate.

The means for supporting the microlenses in the monolayer may be a layer of binder material, such as a polymeric material, or some other construction by which the microlenses are held in a monolayer arrangement, as, for instance, disclosed in the aforementioned de Montebello. To improve the resolution obtained in the resultant image, the microlenses are preferably spaced closely together.

The angle of incidence at which the collimated light is directed at the sheeting determines the central axis of the conical field of view within which the half-tone image is visible. The angular width of that conical field of view is related to the diameter of the axial marking. Larger axial markings are visible across a wider field of view than are smaller axial markings. The size of an individual axial marking is determined in part by the magnitude of energy which creates the marking. If a beam with a higher energy density is used to form the axial markings, the image will tend to have a wider conical field of view. Similarly, if a beam with a lower energy density is used, the image will tend to have a narrower conical field of view. In all cases because a half-tone mask is used as taught herein the image is integrated-directional.

When forming images in microlens sheeting which comprises the preferred glass microspheres having an average diameter of approximately 50 to 60 micrometers, the light beam exposure is preferably adjusted to form axial markings having diameters within a range from 1 to 20 micrometers. When the microlenses are substantially all about 50 micrometers in diameter and the diameter of the axial markings is from 3 to 10 micrometers, each directional, photographic or half-tone image is viewable only across a cone of about 10 to 20 degrees. The beam of collimated light may be adjusted to form larger markings viewable within larger conical fields of view, however, there would seldom be need for a directional image to be visible across a cone exceeding 30 degrees. On the other hand, a directional image which was viewable only across a cone of less than six to eight degrees might be difficult to locate.

The axial markings are typically roughly circular, but may have elongated or other shapes obtained, for example, by rotating a beam of highly collimated light through a range of incidence angles such that each imaged microlens is irradiated by two or more pulses at slightly different angles to produce axial markings formed from overlapping smaller openings. Such elongated or other shaped axial markings may be regarded as a series of axial markings. Sets of noncircular axial markings formed according to the invention will be visible as integrated directional, photographic or half-tone images within noncircular conical fields of view.

An advantage of this invention is that, as noted above, directional images which are formed using a half-tone mask are integrated-directional, i.e., substantially all portions of the image are visible only at angles at which all other portions of the image are visible. When a sheet containing a directional image formed according to this invention is rotated through the conical field of view, substantially all portions of the image become visible simultaneously as the conical field of view is entered, and substantially all portions of the image disappear simultaneously as the conical field of view is passed. Directional images formed with continuous tone masks typically are not integrated; as a sheet containing such an image is rotated through the conical field of view, the darker portions of the image are visible before the lighter areas, and as the sheet is rotated further, the darker portions of the image remain visible after the lighter portions have disappeared.

An integrated-directional image is an unexpected and novel effect achieved by the use of a half-tone mask. The half-tone mask selectively blocks in an imagewise pattern all or none of the collimated light at any particular portion of the image. Therefore, substantially each microlens which is struck by the collimated light is struck by essentially the same amount of such light as any other microlens which is struck, thereby causing all the axial markings which are formed to be essentially the same size. Each axial marking is formed by an essentially equal amount of energy directed at the same angle of incidence as all the markings; hence, substantially all of the axial markings are the same size, and the set of axial markings is visible as an integrated-directional image. It is to be understood that not all microlenses and half-tone dots will be precisely aligned such that absolutely all microlenses are struck by precisely the same amount of collimated light, and that, therefore, not all of the axial markings which are formed will be of precisely the same size and visible across precisely the same field of view. We have found that the cumulative effect provided by the few partially masked microlenses (which contain smaller axial markings) is minimal and typically essentially undetected by visual observation.

A sheet containing a colored, rather than a black and white, integrated-directional, half-tone image may be formed from microlens sheeting comprising a transparent spacing layer disposed between the back surfaces of the microlenses and a masking layer wherein the axial markings are formed. The axial markings formed in such sheeting may be coated or impregnated with a colored coating, as disclosed in the aforementioned Hockert et al. reference, to provide a colored image. Such sheeting may be used to make transparent sheets containing integrated-directional, half-tone images by removal of any masking layer through which the coloring material is applied.

A transparent embodiment of the novel sheet may be adapted to be adhesively bonded over the information areas of a document. In one such embodiment, as an authenticating means for instance, the integrated-directional, half-tone image may be formed so as to be visible at an angle at which a document is not normally viewed so as to not interfere appreciably with the legibility of the underlying information. When placed as an overlay directly on the information bearing portion of a document, an automobile certificate of title for instance, the sheet prevents tampering with the information and provides a secure means for authentication of the document without interfering with its normal use. In another embodiment, the image may be formed so as to be visible at an angle substantially orthogonal to the document to ensure that a reader gets an important message. The underlying information may then be read by tilting the document out of the conical field of view across which the half-tone image is visible.

A novel sheet of the invention may be formed which contains more than a single integrated-directional, half-tone image. After directing highly collimated light at a sheet in imagewise fashion at a first selected angle of incidence, collimated light may be directed at the sheet in imagewise fashion at a second selected angle of incidence, thus providing a sheet wherein one half-tone image is visible at the first selected angle of incidence and another half-tone image is visible at the second selected angle of incidence. Further repetitions of the step may be performed to provide a sheet of the invention with more than two integrated-directional, half-tone images. The angles of incidence selected are preferably spaced sufficiently far apart that the respective conical fields of view of the different authenticating images will not overlap or interfere with each other.

The great detail and unique optical appearance of an integrated-directional, half-tone image make it a useful medium for authentication or verification. The ability to form multiple images in a single sheet further increases this utility. A passport for instance could include full length and side profile images of the holder as well as the familiar single facial view. Other applications wherein sheets bearing integrated-directional, half-tone images may be useful will be obvious to those skilled in the art.

DESCRIPTION OF THE DRAWINGS

FIG. 1 shows a microlens sheet 10 which comprises a monolayer of transparent microspheres 12 which are partially embedded in a layer of bead binder 14, typically a polymeric material. Microlens sheeting in which the microlenses partially protrude from the surface is referred to as "exposed-lens" sheeting. There is a masking layer 16 disposed at the rear surface of each microsphere. The masking layer typically makes only hemispherical contact with each of the microspheres and does not extend between adjacent microspheres. If the masking layer is reflective and the microspheres have an index of refraction of approximately 1.9, the sheeting will be retroreflective. The sheeting shown is adapted to be adhered to an object such as a passport with a layer of adhesive 18.

Figure 1:
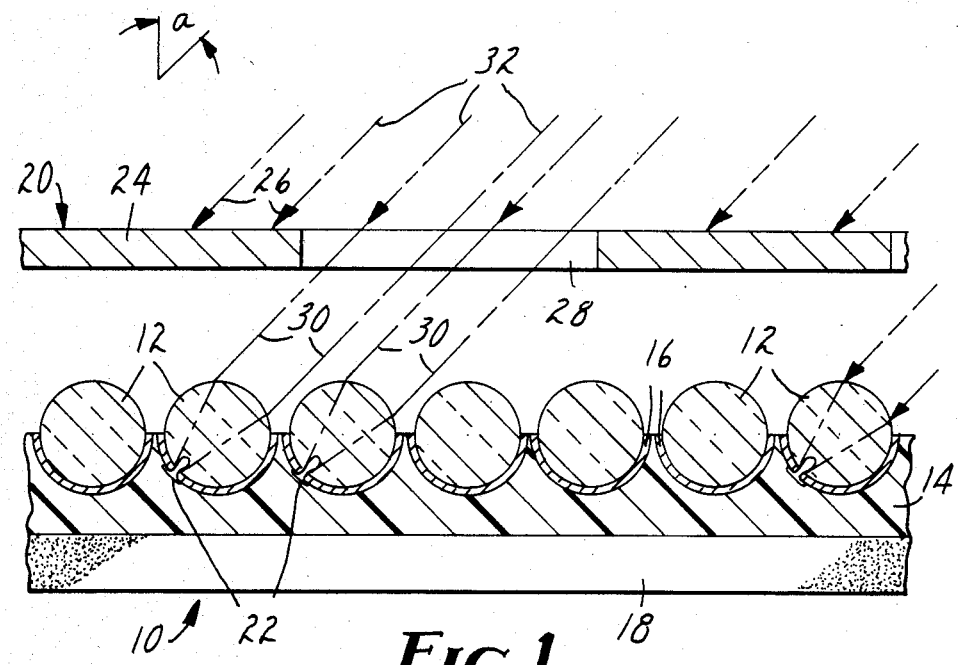
FIGS. 1 and 2 are schematic representations of examples of different forms of sheeting upon which this invention may be practiced, and show the formation therein of integrated directional, half-tone images.

A half-tone mask 20 is used to form a set of axial markings 22 which is visible as an integrated directional, half-tone image, an object of this invention. The half-tone mask comprises dots or opaque regions 24 where collimated light is not transmitted 26 through the mask and transparent regions 28 where collimated light is transmitted 30 through the mask to strike the sheeting.

To form a set of axial markings which is visible as an integrated-directional, half-tone image a beam of highly collimated light 32, typically a pulsed laser beam, is directed through the half-tone mask 20 to the face of the sheeting 10 at an incidence angle Alpha. Alpha is shown here to be approximately 45°. Each microsphere which the transmitted collimated light strikes focuses the light incident upon it to form an axial marking 22. In this type of sheeting, each axial marking is a deformity within an individual microlens that typically opens through the rear surface of the microsphere and through the masking layer disposed on the rear surface thereof. After the half-tone mask is removed, the set of axial markings will be visible as an integrated-directional, half-tone or photographic image within a conical field of view centered upon the incidence angle Alpha.

Figure 2:
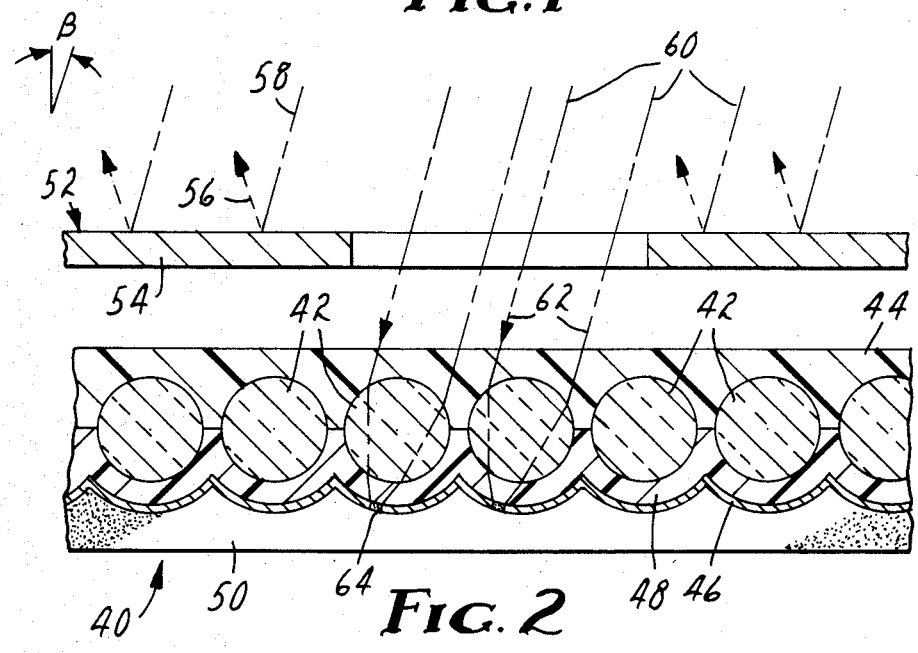

FIG. 2 shows another type of microlens sheeting 40 in which an integrated-directional, half-tone image may be formed according to this invention. The microlens sheeting shown is "embedded-lens" sheeting wherein spherical microlenses 42, are embedded in a transparent protective overcoat 44, typically a polymeric material. A masking layer 46 is disposed behind the microspheres at the back of a transparent spacer layer 48 which is also typically a polymeric material. Such sheeting typically comprises a layer of adhesive 50 by which the sheeting may be adhered to a desired object.

The half-tone mask 52 shown comprises substantially reflective half-tone dots 54. Using a reflective mask is a preferred mode of this invention because the opaque portions of the mask reflect 56 much of the collimated beam 58 incident upon them rather than absorbing the energy. The collimated light 60 is directed through the half-tone mask to the face of the sheeting at an incident angle Beta. The portion 62 of the light which is transmitted through the mask is focused by each microsphere 42 which it strikes to form an axial marking 64 in the masking layer 46. After the half-tone mask 52 is removed, the set of axial markings will be visible as an integrated-directional, half-tone image within a conical field of view centered upon the incidence angle Beta.

These FIGURES, which are not to scale, are idealized, e.g., the microspheres are represented as being perfect spheres of uniform circumference which are arranged in a uniformly spaced monolayer, and as such are intended to be merely illustrative and nonlimiting. An integrated-directional, half-tone image may be formed according to this invention in any sheeting comprising a monolayer of microlenses in which a directional image may be formed with irradiation with a beam of collimated light.

EXAMPLE

An ordinary halide continuous tone photograph of a subject's face was converted to a 133 line half-tone lithographic film negative. A partially reflective half-tone negative was then prepared from the lithographic negative according to the method disclosed in U.S. Pat. No. 4,314,022 (Fisch).

The resulting negative was placed as a mask on the surface of a piece of "SCOTCHLITE" Brand High Gain Reflective Sheeting No. 7610, available from the Minnesota Mining and Manufacturing Company of St. Paul, Minn. The sheeting comprises a monolayer of closely spaced transparent glass microspheres, substantially all of which have diameters of approximately 50 to 70 microns and a refractive index of approximately 1.9. The microspheres have a chemically deposited reflective layer on the rear surface and are partially embedded in a polymeric binder containing a black pigment. The back side of the sheeting is coated with a pressure sensitive adhesive which is protected by a release liner.

The mask and sheeting were then irradiated using a Model 532Q Neodymium: Yttrium Aluminum Garnet (Nd:YAG) Q-switched laser available from the Control Laser Corporation of Orlando, Fla. The wavelength of the beam emitted by the Model 532Q laser is 1.064 micrometers. The average laser power was 100 watts at a pulse repetition rate of 10 kilohertz with a pulse width of approximately 200 nanoseconds.

The laser beam was focused to provide a spot approximately 3.5 millimeters in diameter on the mask and sheeting. The laser beam was then scanned across the mask and sheeting at a speed of approximately 1000 centimeters per second at an angle 15° above normal, i.e., at −15° entrance and 0° rotation in standard retroreflection terminology. At the end of each scan, the sheet and mask were moved one millimeter in a direction perpendicular to the direction of the scanning pass. The sheeting and mask were alternately scanned and moved until the entire area of the sheeting and mask had been irradiated.

After the mask was removed a positive image of the subject's face could be seen when the sheet was viewed at the angle of incidence of the laser beam. The integrated-directional image was visible within a conical field of view approximately 30° wide, the central axis of which was the angle of incidence. In terms of tonal gradation and resolution, the image was photographic or half-tone in appearance.

A second image was formed by repeating the procedure and conditions outlined above, except the laser beam was directed at the sheeting at an angle of incidence 15° below normal, i.e., at +15° entrance. The integrated-directional image was visible within a conical field of view approximately 30° wide, the central axis of which was the angle of incidence. As was the first image, the second image was photographic or half-tone in appearance in terms of tonal gradation and resolution. The second conical field of view was distinct from the conical field in which the first image was visible. There was no apparent interference between the two images.

This example presents only one embodiment of the sheeting upon which this novel method may be performed and is intended to be nonlimiting. The precise location of the axial markings formed according to the invention, and the particular mechanism by which they are formed may differ according to the specific structural elements present in the sheet which is to be made into a novel sheet of the invention, i.e., a sheet bearing an integrated-directional, half-tone image.

Various modifications and alterations of this invention will become apparent to those skilled in the art without departing from the scope and spirit of this invention.

What is claimed is:

1. A sheet comprising:
   (a) a monolayer of closely spaced transparent microlenses,
   (b) a means for supporting said microlenses in said monolayer, and
   (c) a set of axial markings of substantially equal size, each marking located at the rear of a microlens at a position such that the set of axial markings is visible throughout a selected conical field of view as an integrated-directional, half-tone image having gradations of light and dark areas.

2. A sheet as defined in claim 1 wherein said microlenses are microspheres.

3. A sheet as defined in claim 2 wherein said microspheres are glass.

4. A sheet as defined in claim 2 wherein said microspheres have an index of refraction of approximately 1.8 to 2.0.

5. A sheet as defined in claim 1 which is retroreflective.

6. A sheet as defined in claim 1 comprising a spacer layer of transparent material covering at least the back surfaces of said microlenses and wherein said axial markings are located on the back surface of said spacer layer.

7. A sheet as defined in claim 1 comprising a specularly reflective layer in contact with the back surfaces of said microlenses wherein each said axial marking is a structural alteration of an individual microlens.

8. A sheet as defined in claim 1 comprising a transparent material covering the front surfaces of said microlenses, and wherein said microlenses have an index of refraction of at least 1.9.

9. A sheet as defined in claim 1 wherein said sheet is substantially transparent and is adapted to be adhesively bonded over information areas of a document without appreciably interfering with the legibility of said information.

10. A sheet as defined in claim 9 wherein said axial markings are disposed to provide an authenticating image which can be viewed only across a cone of about 10 to 20 degrees, and approximately at an angle to the face of said sheet which is appreciably different from the angles at which said document is normally viewed.

11. A sheet as defined in claim 1 further comprising a second set of axial markings disposed such that when said sheet is viewed within a second selected conical field of view, said second set of axial markings is visible as an integrated-directional, half-tone image having gradations of light and dark areas.

12. A sheet as defined in claim 11 wherein the conical field of view within which said second set of axial markings is visible as a half-tone image does not overlap with the conical field of view within which said first set of axial markings is visible as a half-tone image.

13. A method of forming an integrated-directional, half-tone image in sheeting comprised of a monolayer of closely spaced transparent microlenses wherein said method comprises:
   directing highly collimated light through a half-tone mask at a selected angle of incidence to the face of the sheeting to form an axial marking at the rear of each microlens which said light strikes such that the set of axial markings is visible as an integrated-directional, half-tone image having gradations of light and dark areas.

14. A method as defined in claim 13 wherein said highly collimated light is a pulsed laser beam.

15. A method as defined in claim 14 wherein said laser beam scans the entire face of said sheeting.

16. A method as defined in claim 13 wherein said half-tone mask is specularly reflective where not transparent.

17. A method as defined in claim 13 wherein said half-tone mask contains a negative image.

18. A method as defined in claim 13 wherein said half-tone mask is in contact with said face of said sheeting when said collimated light is directed therethrough, and wherein the maximum-size discrete half-tone dots of said mask are at least three times as large as the average diameter of said microlenses.

19. A method as defined in claim 18 wherein said maximum-size discrete half-tone dots are at least four times as large as said average diameter.

* * * * *